H. THOMASON.
GENERAL UTILITY POWER MACHINE.
APPLICATION FILED DEC. 20, 1915.
1,207,663.
Patented Dec. 5, 1916.
2 SHEETS—SHEET 1.
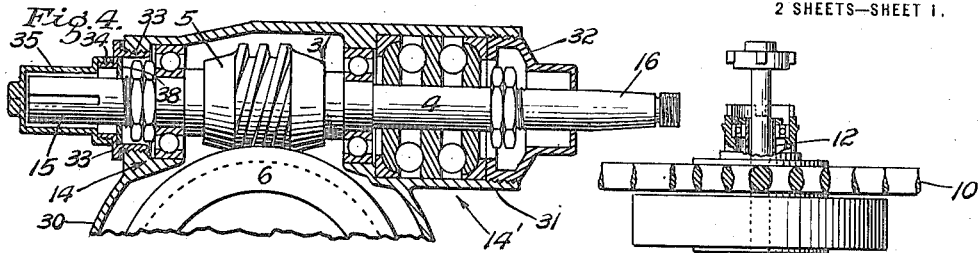
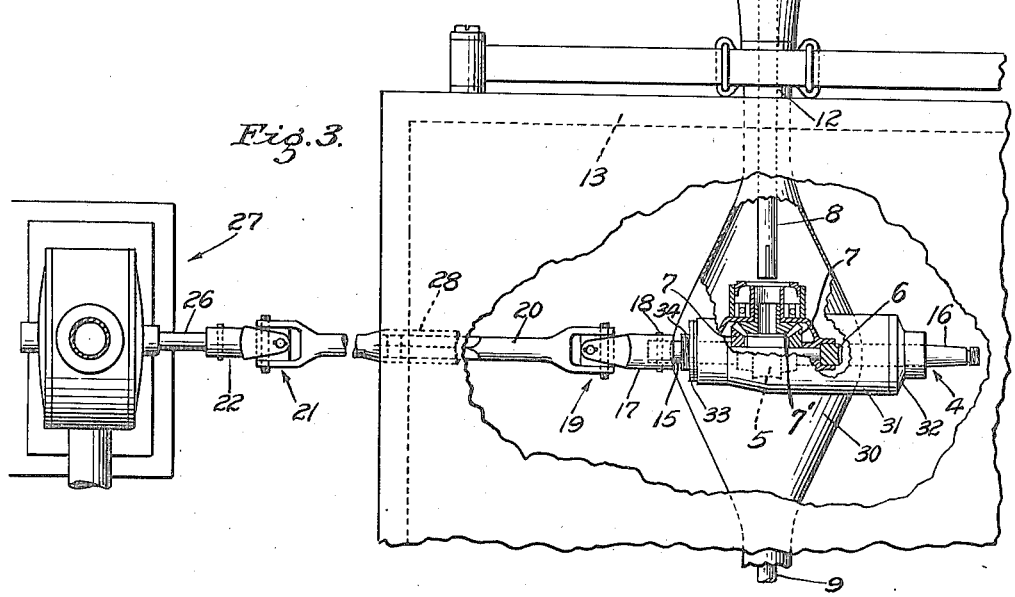
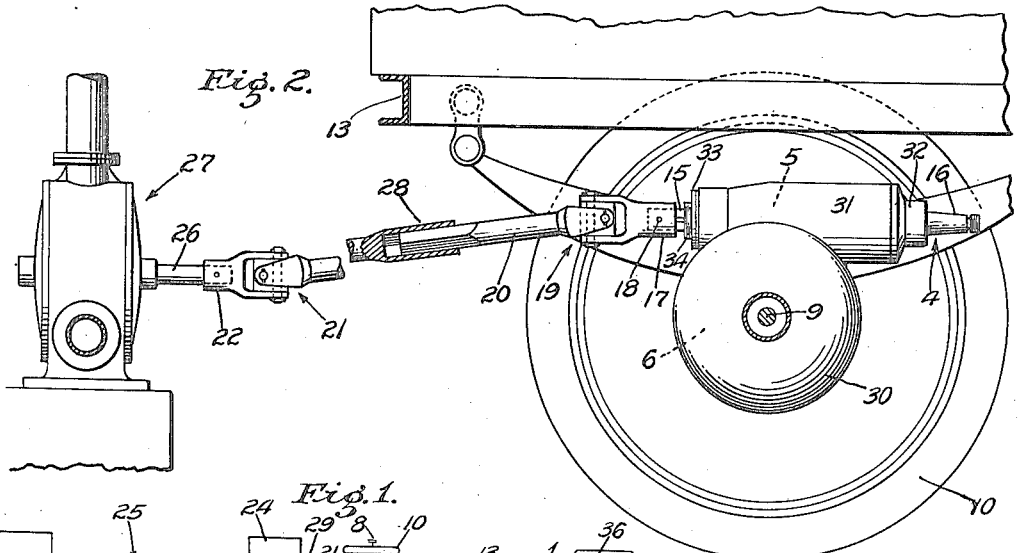
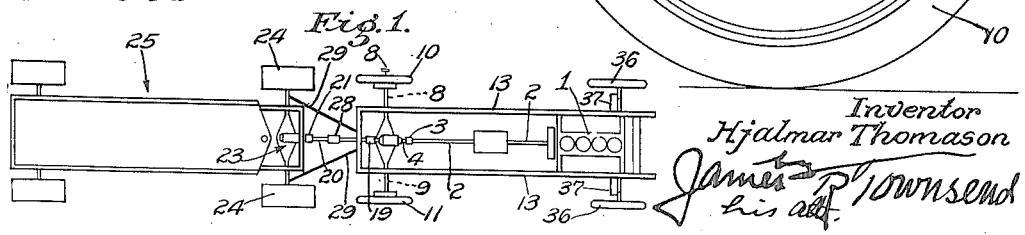
Inventor
Hjalmar Thomason
James R. Townsend
his atty.

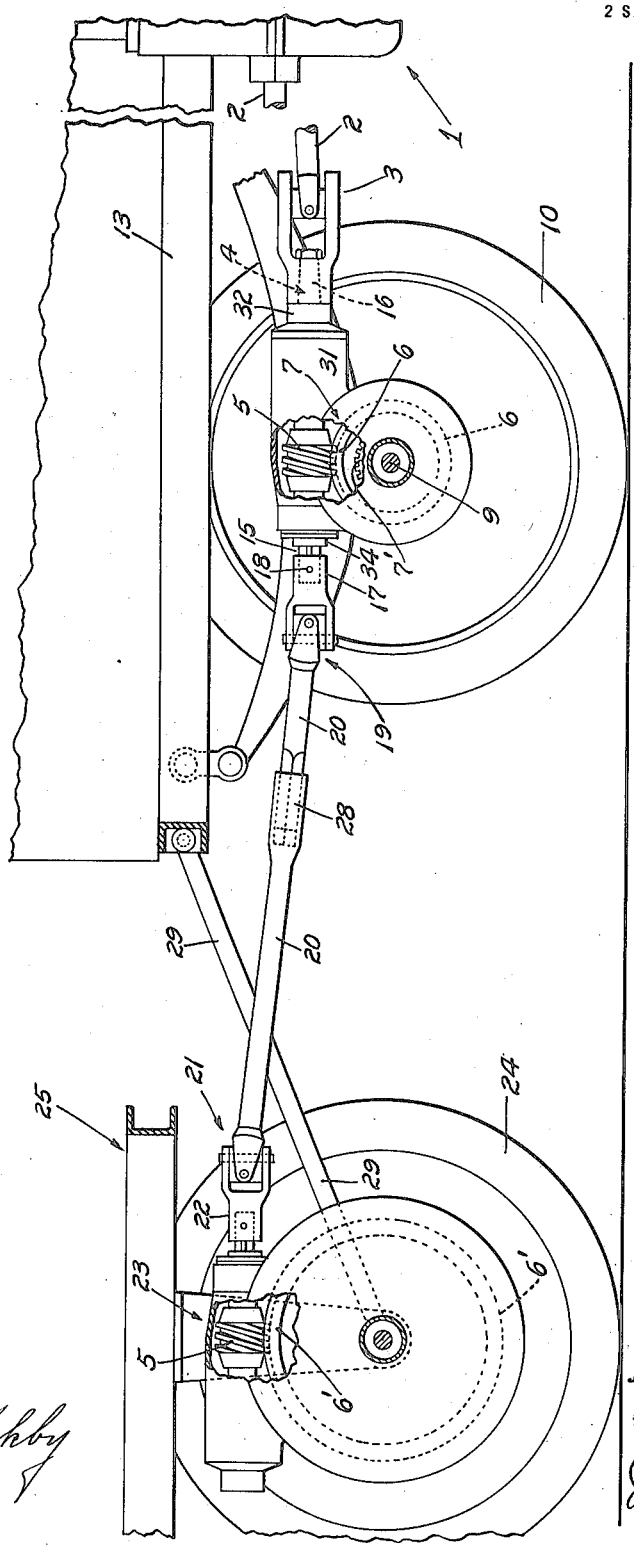

UNITED STATES PATENT OFFICE.

HJALMAR THOMASON, OF LOS ANGELES, CALIFORNIA.

GENERAL-UTILITY POWER-MACHINE.

1,207,663.　　　　　Specification of Letters Patent.　　Patented Dec. 5, 1916.

Application filed December 20, 1915. Serial No. 67,930.

*To all whom it may concern:*

Be it known that I, HJALMAR THOMASON, a subject of the King of Sweden, having declared my intention of becoming a citizen of the United States, residing at Los Angeles, in the county of Los Angeles and State of California, have invented a new and useful General-Utility Power-Machine, of which the following is a specification.

It is well known that there are many conditions arising on farms, in garages and other places where power from an internal combustion engine might occasionally be very desirable and, at times of great value, but where the occasions for use are not of sufficient frequency to warrant the installation of an internal combustion engine for power purposes, and also that such conditions may arise where the installation of an internal combustion engine might be inconvenient or impossible for want of floor space or for some other reason.

It is also well known that in some motor propelled traction machinery such as reaping machines as an example, it sometimes occurs when the ground is soft that the traction of the usual traction wheels of the vehicle is insufficient to operate the accessory mechanism, such as the binding mechanism of said reaper, which is ordinarily operated by power taken from the ground wheels of the machine.

It has also become quite common for farmers and others to own self-propelled vehicles in which power from an internal combustion engine or other motor is applied to drive traction wheels for the propulsion of the vehicle, that such power is applied to the traction wheels from differential mechanism driven by worm gearing, and that commonly both of said traction wheels are detachably connected to the differential mechanism, so that when one wheel is detached from said mechanism and the other wheel is held as by a heavy load or a brake, the motor may run without driving either of said wheels.

An object of this invention is to provide a construction and combination of elements whereby the power of the internal combustion engine or other motor of the self-propelled vehicle may be conveniently utilized alternatively with respect to all of the situations above mentioned.

A further object of the invention is to provide means whereby the power of the self-propelled vehicle of the usual pleasure or runabout character can be utilized to drive a trailer the traction wheels of which are geared down to a low gear as compared with the lowest gear of said self-propelled vehicle; so that instead of equipping the trailer with a separate engine, the power from the motor of the standard vehicle may be applied to drive the trailer instead of the vehicle to which the motor belongs. By this invention I propose to supply to miners, farmers, freighters and others, means whereby heavy loads may be readily transported at slow speed, and whereby the user has, always at his command, a standard speed motor-vehicle that may be detached to serve as a runabout.

The invention is regarded as broadly new and pioneer in that I have provided the rear end of the worm-shaft of a self-propelled vehicle with a power transmitting attachment.

This invention may be utilized in good measure in some situations even where the traction wheels of the motor vehicle can not be disconnected from the worm-shaft, since by jacks, or other means the traction wheels may be lifted free from the ground where they will rotate as fly wheels; but I may apply the invention in the manner set forth herein bringing into combination the worm-shaft, differential gearing and traction wheels; said wheels being detachable from said gearing; and a shaft extension on said worm shaft, and connections therewith, for alternatively utilizing the power from said worm shaft to drive mechanism without driving the traction wheels of the motor carrying vehicle, so that said traction wheels may serve as a means for transporting the internal combustion engine or other motor from place to place where needed for power purposes, and may then be eliminated as impedimenta to the transmission of power from the motor unit to the secondary utility or device to be operated.

The invention may be carried out in various ways as will be understood by the subjoined detail description.

The accompanying drawings illustrate the invention.

Figure 1 is a diagrammatic plan showing the invention as applied in the case of a low speed trailer operated by power applied from the motor of a self-propelled vehicle of common construction and speed. Fig. 2 is a fragmental side elevation of the motor vehicle shown in Fig. 1 detached from the trailer and applied to a pump. Fig. 3 is a fragmental plan of the mechanism shown in Fig. 2, the traction wheels being disconnected from the worm drive by moving one axle out of engagement with the differential gearing, it being understood that the other traction wheel, not shown, is held as by friction with the ground, or a brake, not shown, or both. Fig. 4 is a detail of the power shaft in its housing and connected with worm gear and having its rear power extension covered or capped over as when such extension is not in use. Fig. 5 is a fragmental side sectional elevation illustrating a high geared motor vehicle coupled with a low geared trailer, the high gear drive of the motor vehicle being disconnected to transmit power from the motor on the motor vehicle to the low gear drive of the trailer and thus propel said trailer and motor vehicle at low speed.

The motor may be of any suitable character as a steam engine, an electric motor or the like, and is indicated at 1, as an internal combustion engine, connected to rotate the shaft 2 which is connected in the usual manner by a universal joint 3 with one end of a worm shaft 4, which shaft is provided with a worm 5 driving the worm gear 6, which in turn is connected with the usual differential gearing 7 to drive the axles 8, 9 to which the traction wheels 10, 11 are connected.

The axle construction is such that the traction wheels may be disconnected from the force of the worm drive in some satisfactory way, this being effected in the form shown by sliding one of the axles endwise, as axle 8, and out of engagement with its differential gear 7' of the differential train 7, whereupon said disconnected gear becomes an idler and revolves freely with the train, worm gear 6 and worm 5, thereby allowing the other differential gear on axle 9 and consequently axle 9 to remain at rest, the corresponding wheel being held, as by a load, upon the ground, except in cases such as suggested in Fig. 1 where of course the travel of the trailer may drive the front vehicle. When axle 8 is disconnected from gear 7' and shaft 16 is driven, the axle 9 and gear thereon not shown, corresponding to gear 7', will be stationary, being held by the traction wheel 11 on axle 9; and gear 7' will be driven at double speed. By this arrangement the axles 8 and 9 may both be freed from the force of the worm drive by simply disengaging one of said axles from its respective differential gear 7', as shown in Fig. 3, and holding the other wheel as by a load or brake. The traction wheels 10, 11 are connected through the usual body springs 12 with the frame 13 of the self-propelled vehicle that carries the motor.

The mechanism just described corresponds to mechanism now in common use.

The worm shaft 4 is carried in bearings 14, 14' in the usual manner, but said worm shaft has a power transmitting extension 15 at its rear end opposite the power-receiving end 16 of said shaft, and said extension is constructed for connection with a transmitting power appliance, which in the form shown consists of a socket 17 non-rotatively and detachably mounted on the rear end of the worm shaft and fixed thereto by a pin 18. A universal joint 19 is connected to said socket 17, and is connected through power-transmission means, as the rod 20 to the universal joint 21 and socket 22 with the accessory mechanism such as the low gear driving mechanism 23 comprising worm 5' and worm gear 6' for propelling the traction wheels 24 of the trailer 25. The shaft 26 of a rotary pump 27 or a blower, not shown, or any other machine driven by a rotary shaft may be connected with the power extension of the worm shaft. The tumbling rod connection from the power-transmitting rear extension 15 of the worm shaft may be provided with a slip joint 28 and a suitable coupling 29 may be employed to connect axles or the frames of the two vehicles. The gear housing 30 is provided with a worm shaft chamber 31 open from end to end and screw-threaded at its opposite ends to receive the bushings 32, 33, the latter of which is provided with a threaded portion 34 to which a cap 35 is screwed, thus connecting the cap with the housing. The rear extension 15 of the worm shaft is inclosed by the cap 35 when said extension is not connected with the accessory mechanism or machinery, and when it is desired to connect the worm shaft with such mechanism or machinery, said cap may be removed and stored.

In practical use by means of this invention the farmer may supply himself with an equipment comprising two vehicles, each having power-driven traction wheels, the traction wheels of one of said vehicles having comparatively low gear, and the other vehicle having a motor adapted to be connected and disconnected from the traction wheels of said other vehicle. He may also equip himself with various utilities, such as a rotary pump at a well; a lathe, not shown, in his garage; a corn sheller; feed grinders and other machinery, not shown, at different places on the farm. He may in practice attach the low geared vehicle as trailer 25 to a higher-geared vehicle and may draw said low geared vehicle to a place where the same is to be loaded, and leaving it there to be loaded by others, he may then proceed on an errand with his higher geared motor-vehicle and may incidentally operate any or all of the machinery above-mentioned by making suitable connection therewith as occasion arises; and finally may return with his motor vehicle to the trailer which may then have become loaded so as to require the application of the power to the low speed in order to move the load. Connection will then be made through the transmission means of the low gear driver 23 of the trailer. The trailer will then be attached to the motor vehicle and the traction wheels 10 thereof disconnected from the worm shaft as by disengaging axle 8 with its differential gear 7', see Fig. 3. Thereupon the power may be transmitted from the motor on the motor vehicle frame to the trailer, and said trailer may then push the motor vehicle along in front of it to destination. During this travel of the motor vehicle and trailer the disengaged axle may extend as shown in Fig. 1 or may be temporarily removed, but in case the supplementary drive is used with the motor vehicle standing still, as shown in Figs. 2 and 3, the axle may be withdrawn only just sufficient to disengage with its differential gear 7'.

It is thus seen that by a very slight change in the worm shaft of a motor vehicle I have made it possible to greatly increase the equipment of a farm or other industrial place with minimum expense of outlay and space.

The wheel carried frame 13 of the motor vehicle is supported by the traction wheels 10, 11 and the usual steering wheels 36 are mounted and operated by the usual steering mechanism indicated at 37.

38 is a dust excluding and grease retaining washer inside the bushing 34 to prevent the dust from entering and grease from escaping from the bearing 14.

I claim:—

1. Two vehicles each having traction wheels; the traction wheels of one being geared to lower speed than the traction wheels of the other; means connecting the vehicle frames together; a motor mounted on one of said vehicles; a worm shaft connected to and driven by the motor; means detachably connecting the worm shaft to drive the traction wheels of the vehicle on which said motor is mounted and means for detachably connecting said worm shaft with the traction wheels of the second vehicle.

2. A general utility power machine comprising a frame; traction wheels for said frame; a worm shaft; differential gearing; means to connect the worm shaft to drive the differential gearing; means to detachably connect the differential gearing with said traction wheels to alternately drive and free the same; means to apply power to one end of said worm shaft to rotate the same; power transmission means; and means to detachably connect the other end of said shaft to said power transmission means, whereby, when said traction wheels are free from the differential gearing, said traction wheels simply serve as a support for the worm shaft and the power may be transmitted to operate other machinery.

3. A general utility machine comprising a wheel carried frame, said frame having a traction wheel; a shaft; differential gearing; means to connect the shaft with the differential gearing to drive the same; means for detachably connecting the differential gearing with said traction wheel to alternately drive and free the same; a motor on said frame; means to apply power from the motor to one end of said shaft to rotate the same; power transmission means and means to detachably connect the other end of said shaft to said transmission means, whereby, when said traction wheel is disconnected from the differential gearing said traction wheel simply serves as a support for the shaft, and power may be applied through said transmission means from said shaft to operate other machinery.

4. A general utility machine comprising a wheel carried frame having traction wheels; a worm drive shaft; means to detachably connect the force of the shaft through a differential with said traction wheels to drive and to free the same; transmission means; means to apply power to one end of said shaft to rotate the same; and means to detachably connect the other end of said shaft to said transmission means, whereby, when one of said traction wheels is disconnected from the differential gearing said traction wheels simply serve as a support for the shaft.

5. A general utility machine comprising a frame; a motor on the frame; traction wheels for said frame; a worm shaft; means to connect the motor with the shaft; means for detachably connecting the shaft with the traction wheels to alternately drive and to free the same; transmission means; means to apply power to one end of said shaft to rotate the same; and means to detachably connect the other end of said shaft to said transmission means; whereby, when said traction wheels are disconnected from the shaft, said traction wheels simply serve as a support for the shaft, and power from the motor may be transmitted through the shaft to said power transmitting means to drive other machinery.

6. The combination with a motor vehicle and traction wheels for said vehicle, of a worm shaft connected to drive said traction wheels and provided with an end extension, and a supplementary power connection detachably connected to said end extension to transmit power therefrom.

7. The combination with a motor vehicle and traction wheels for said vehicle, of a worm shaft connected to drive said traction wheels and provided with an end extension, a supplementary power connection for said end extension, said power connection comprising a universal joint coupled to said end extension, a power shaft connected with said universal joint, and coupling means at the opposite end of said power shaft to transmit power therefrom.

8. In a general utility machine a differential gear; a worm shaft to drive said gear; a housing for said gear and worm shaft, said housing having a worm shaft chamber open for said worm shaft at both ends; and a cap connected to the housing to close the rear open end of the worm shaft chamber; said worm shaft being provided with an extension adapted for connection to power-transmitting means and being protected by the cap when the same is in place and exposed for use when the cap is removed, substantially as and for the purpose set forth.

9. Two vehicles each having traction wheels; means connecting the vehicle frames together; a motor mounted on one of said vehicles; a worm shaft connected to and driven by the motor; means detachably connecting the worm shaft to drive the traction wheels of the vehicle on which said motor is mounted and means for detachably connecting said worm shaft with the traction wheels of the second vehicle.

In testimony whereof, I have hereunto set my hand at Los Angeles, California, this 11th day of December, 1915.

HJALMAR THOMASON.

Witness:
    JAMES R. TOWNSEND.